(12) United States Patent
Luo et al.

(10) Patent No.: US 6,889,221 B1
(45) Date of Patent: May 3, 2005

(54) PARALLEL RANDOM SAMPLING

(75) Inventors: Gang Luo, Madison, WI (US); Ambuj Shatdal, Madison, WI (US)

(73) Assignee: NCR Corporation, Dayton, OH (US)

(*) Notice: Subject to any disclaimer, the term of this patent is extended or adjusted under 35 U.S.C. 154(b) by 396 days.

(21) Appl. No.: 09/935,870

(22) Filed: Aug. 23, 2001

(51) Int. Cl.[7] .............................................. G06F 17/30
(52) U.S. Cl. .................. 707/2; 707/1; 707/5; 707/100; 707/101
(58) Field of Search .......................... 707/1, 2, 5, 100, 707/101, 6, 7, 3, 102

(56) References Cited

U.S. PATENT DOCUMENTS

| | | | |
|---|---|---|---|
| 5,878,426 A | 3/1999 | Plasek et al. | |
| 6,003,036 A | 12/1999 | Martin | |
| 6,223,171 B1 | 4/2001 | Chaudhuri et al. | |
| 6,226,629 B1 * | 5/2001 | Cossock | 707/3 |
| 6,564,221 B1 * | 5/2003 | Shatdal | 707/102 |
| 2002/0198863 A1 * | 12/2002 | Anjur et al. | 707/1 |

OTHER PUBLICATIONS

Motwani et al., "The probabilistic method Yields deterministic parallel algorithms", IEEE, pp. 8–13.*
Li et al., "Algorithm for loading parallel grid files", ACM, pp. 347–356.*
Manku et al., "Random sampling techniques foe space efficient online computation of order statistics of large datasets", ACM, pp. 251–262.*

* cited by examiner

Primary Examiner—Jean M. Corrielus
(74) Attorney, Agent, or Firm—Trop, Pruner & Hu, P.C.

(57) ABSTRACT

A parallel random sampling algorithm (such as a parallel simple random sampling algorithm) utilizes the parallelism of a parallel relational database management system. A random number generator in one node generates random number seeds for a second random number generator in each of the nodes. Random numbers generated by the second random number generators in parallel are used to obtain random sample tuples in each of the nodes.

31 Claims, 4 Drawing Sheets

PARALLEL RANDOM SAMPLING

BACKGROUND

Relational databases are used for storage and retrieval of information. The information is structured in the database as two-dimensional tables of rows and columns. A column heading designates the type of data stored in each column.

Users are able to access the database information typically by using database management software. The database storage media, management software, and other hardware and software components together make up a database management system, or DBMS. The database management software provides specialized commands for accessing and manipulating the database information. Such commands are according to a standard database-query language, such as a Structured Query Language (SQL).

Traditionally, a DBMS processes queries in batch mode. In other words, a user wanting to extract information from the database would submit a query, wait some amount of time during which no feedback is provided, and then receive an answer.

It is increasingly common for a DBMS to present progressively refined intermediate results to a query during processing of the query. The intermediate results are displayed typically along with a "confidence" factor. For accurate intermediate results, random sampling is used. However, in a parallel DBMS having multiple nodes, randomness may be lost if one node produces a result (in response to a query) faster than another node. This may lead to a skewing of results so that intermediate results are more likely to have a low confidence factor.

SUMMARY

In general, an improved method and apparatus of performing parallel random sampling (such as parallel simple random sampling) in a parallel database system is provided. For example, a database system comprises a plurality of nodes, with each node having a storage for storing tuples of a relation. Each node also includes a controller adapted to generate random numbers, with the controller adapted to further determine a number of random samples to generate using the random numbers.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

According to some embodiments, a parallel simple random sampling algorithm is implemented that fully utilizes the parallelism of a relational database management system (RDBMS). The parallel simple random sampling algorithm is performed by a random sampling routine, which uses a first random number generator and a second random number generator. The first random number generator generates the seeds for the second random number generator. In a parallel database system having a plurality of data server nodes, the second random number generator is executed at each data server node. In this way, the random numbers used to obtain random sample tuples are generated on all data server nodes in parallel, which leads to efficient generation of random sample tuples from tables in the database.

Random sampling is used in a variety of database applications. For many query operations, processing an entire data set is either unnecessary or too expensive to perform. By randomly sampling data elements in the data set, response time and resource usage may be lessened. In one example, random samples are used to obtain more accurate intermediate results for display in response to a query. However, random sampling can be used in other applications.

A population may be sampled according to different sampling principles. In a simple random sample, each member of the population being sampled has an equal chance of being selected. In a stratified random sample, the population is divided into groups and random samples are taken from each group. The following discussion refers to simple random samples. However, principles described herein for simple random sample techniques may be applied to other types of random sampling techniques.

Figure 1:
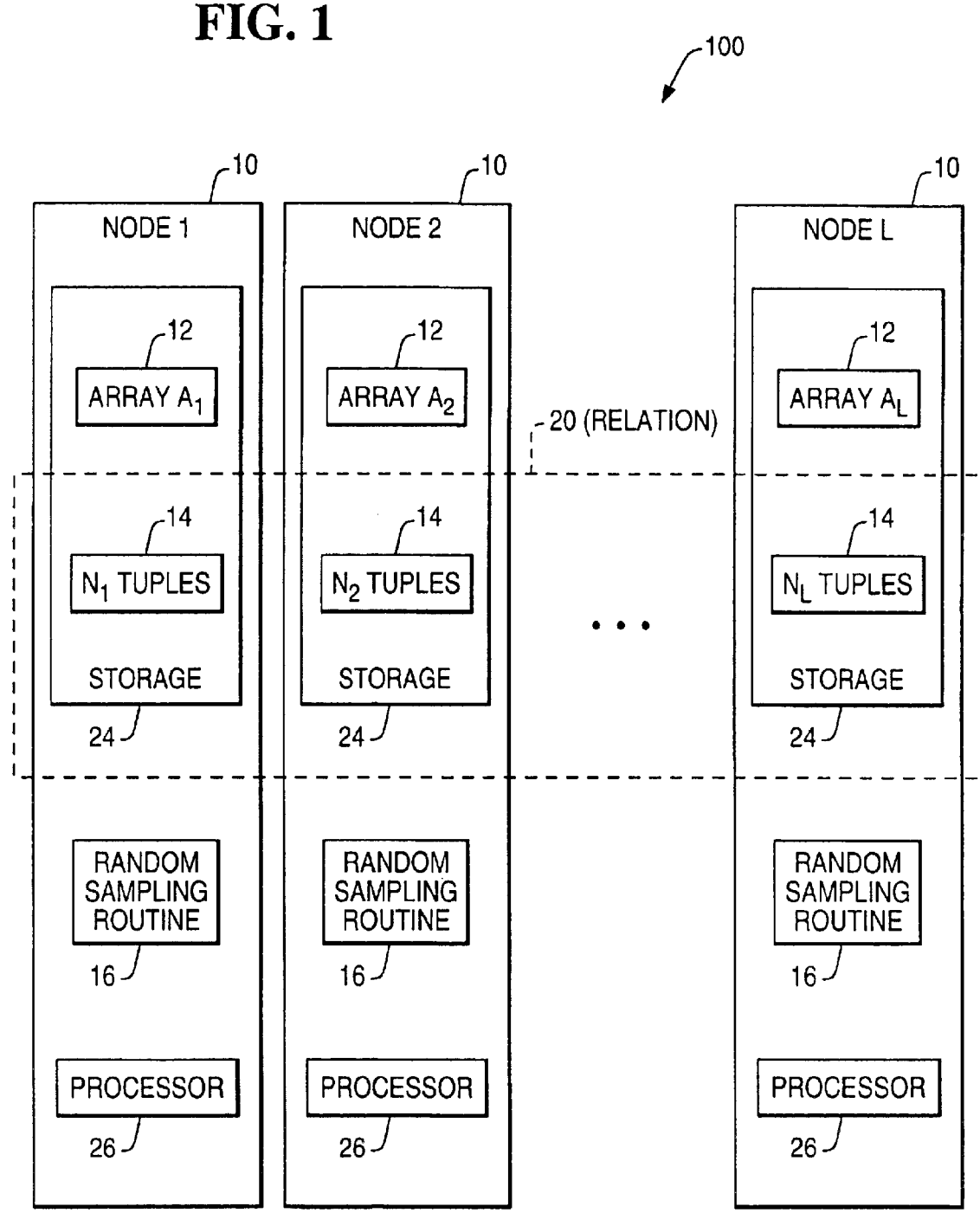
FIG. 1 is a block diagram of an example parallel database system.

A shared-nothing parallel RDBMS 100 with L (L being an integer number) data server nodes 10 is depicted in FIG. 1, according to one example. Each of the nodes 10 includes a processor (or plural processors) 26 for executing programs such as database management software. In general, the database management software is responsible for managing access to and manipulation of data (stored in one or more tables).

One of the programs executable by each processor 26 is a random sampling routine 16. In one embodiment, the random sampling routine 16 is executed on each node 10 of the system 100. The random sampling routine 16 produces random sample tuples that may be used during query processing. FIG. 1 shows the random sampling routine 16 running in each of the plural nodes 10. In another embodiment, the random sampling routine 16 can run in some (two or more) of the plural nodes 10.

Each node 10 further includes a storage module 24 for storing tuples, or rows, of relations, or tables, within the parallel RDBMS 100. A "storage module" refers to one or plural storage devices. The storage modules 24 in one arrangement are part of a storage subsystem, such as a disk array system. Alternatively, the storage modules 24 are part of multiple storage subsystems. A relation 20 including $N_1+N_2+\ldots+N_L$ tuples 14 is depicted in FIG. 1. Variable $N_i$ represents the number of tuples of the relation 20 stored on each node i.

In one embodiment, the relation 20 that is stored on all the nodes 10 has a total of $$N = \sum_{i=1}^{L} N_i$$

tuples. For each 1<i<L, node i stores $N_i$ tuples of the relation 20. The random sampling routines 16 obtain a total of M randomly sampled tuples from the N tuples of the relation 20.

In one embodiment, the random sampling routines 16 use respective arrays 12, as depicted in FIG. 1, to obtain the M random sample tuples. For each $1 \leq i \leq L$, an array $A_i$ of L elements is stored in the respective storage module 24 in each node i. For example, array $A_i$ includes elements $A_{i1}$, $A_{i2}, \ldots, A_{iL}$. The initial value for each array element is 0.

Figure 2:
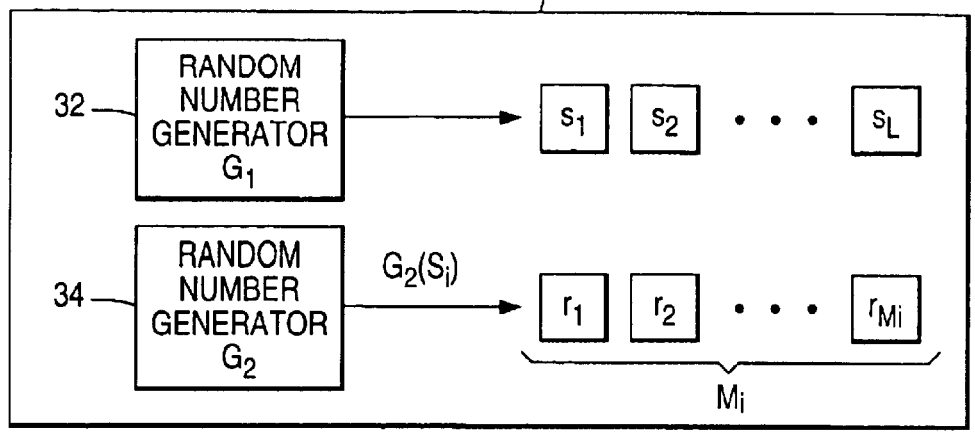
FIG. 2 is a block diagram of a random sampling routine having two random number generators according to one embodiment of the invention.

In one embodiment, the random sampling routine 16 includes two random number generators $G_1$ and $G_2$, as shown in FIG. 2. $G_2$ is different from $G_1$. The random number generators $G_1$ and $G_2$ are actually pseudo-random number generators. The random number generator $G_1$ generates L random numbers $S_1, S_2, \ldots s_L$, one for each node i ($1 \leq i \leq L$). The random number generator $G_2$ that is executed in each of the nodes 10 uses the respective one of $s_1, s_2, \ldots s_L$ as a seed to generate $M_i$ random numbers at each node i. Thus, at node i, random number generator $G_2$ receive random number $s_i$ to generate random numbers $r_1, r_2, \ldots, r_{Mi}$.

In one embodiment, the random number generator $G_1$ is executed in one node of the parallel RDBMS. The random number generator $G_2$, however, is executed on all N nodes i of the parallel RDBMS ($1 \leq i \leq L$).

Figure 3:
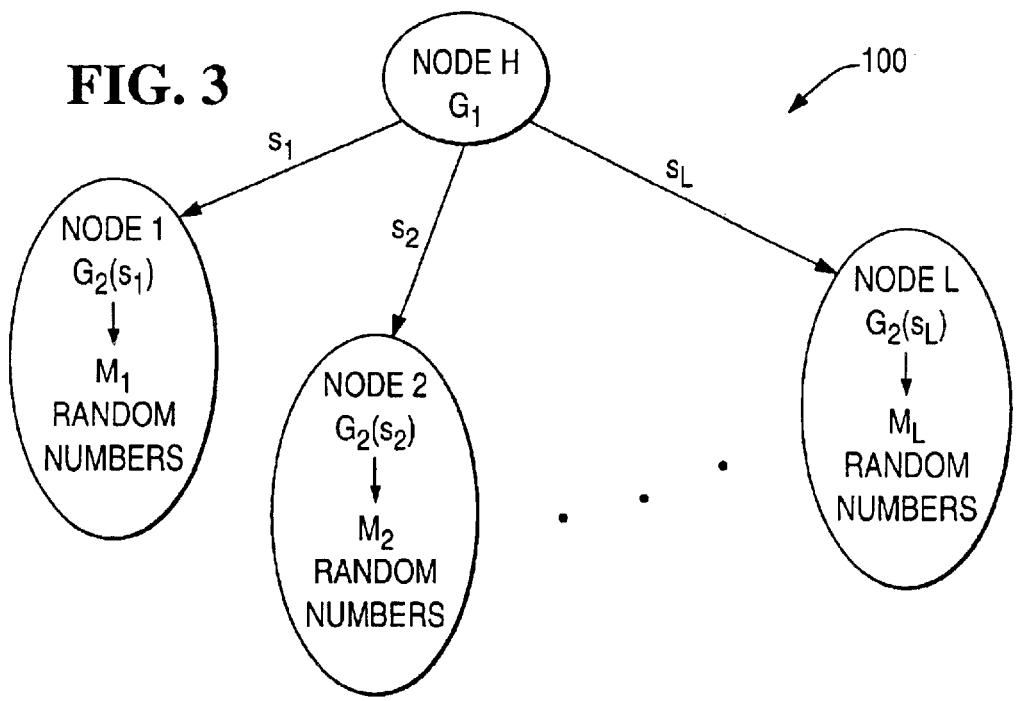
FIG. 3 illustrates distribution of random number generator seeds.

In the example of FIG. 3, the random number generator $G_1$ is executed on node h ($1 \leq h \leq L$), to produce random numbers $s_1, s_2, \ldots, s_L$. These random numbers are sent to respective ones of the L nodes. Thus, random number s, is sent to node 1, $s_2$ is sent to node 2, . . . , and $s_L$ is sent to node L. At each node i, Mi random numbers are generated. Thus, a total M random numbers are generated, where $M = M_1 + M_2 + \ldots + M_L$.

The total number of random numbers M to be generated are determined in a number of ways. For example, an arbitrary number of random numbers may be obtained. Alternatively, the number of random numbers to be generated may be a percentage of the total number of tuples in the parallel RDBMS 100.

In one embodiment, the number of random numbers sought (M) is divided by the number of nodes in the parallel RDBMS, such that the generation of random numbers is distributed across all nodes, not just generated by a single or a few nodes. If the total number is not evenly divided among the number of nodes, some nodes may generate more random numbers than others. The distributed generation of random numbers is illustrated in FIG. 3, where in node i, the random number generator $G_2$ receives seed $s_i$ to generate $M_i$ random numbers.

In one embodiment, at each node i, Mi random numbers are obtained using the following formula:

$$M_i = \begin{cases} t+1 & (1 \leq i \leq k) \\ t & (k+1 \leq i \leq L) \end{cases},$$

given M=tL+k ($0 \leq k \leq L-1$), such that $$M = \sum_{i=1}^{L} M_i.$$

In one embodiment, once the M random numbers from the second random number generator $G_2$ are obtained, each node i uses its array $A_i$ to "characterize" the random numbers. The array A has elements whose values are set based on the random numbers r from the second random number generator $G_2$. The random numbers obtained each have a value between 1 and N, where N is the total number of tuples of the relation 20 in the parallel RDBMS 100.

Figure 4:
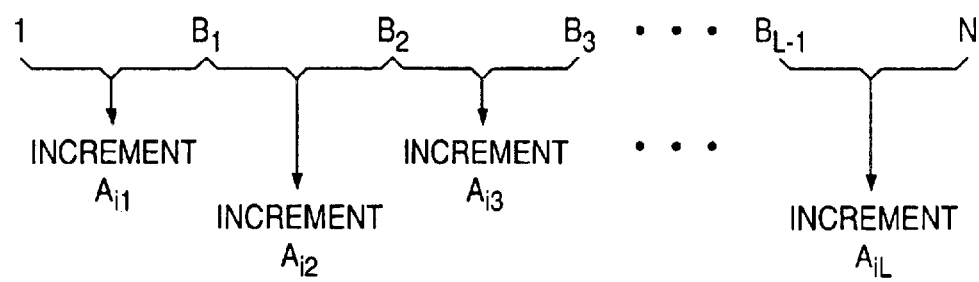
FIG. 4 illustrates how array elements used for random sampling are incremented in response to generated random numbers.

One procedure for characterizing the random numbers $M_i$ at a node i is depicted in FIG. 4. According to one embodiment, at each node i, $M_i$ random numbers are counted. The elements of array Ai are incremented to count the occurrences of random numbers within predetermined ranges. The elements of each array Ai are named $A_{i1}$, $A_{i2}, \ldots, A_{iL}$. For example, array $A_1$, shown in node 1, includes elements $A_{11}, A_{12}, \ldots, A_{1L}$.

At each node i, a count of the random numbers between a first range is maintained in $A_{i1}$, a count of the random numbers between a second range is maintained in $A_{i2}$, and so on until all random numbers with values between 1 and N are counted.

In one embodiment, the predetermined ranges of values for the random numbers is defined as follows:

for each $1 \leq i \leq L$, define $$B_i = \sum_{j=1}^{i} N_j.$$

Define $B_0 = 0$.

In FIG. 4, for example, the range is partitioned into portions 1 to $B_1$, $B_1$ to $B_2$, $B_2$ to $B_3$, and . . . , $B_{L-1}$ to N. If a value of a random number is between 1 and $B_1$, array element $A_{i1}$ is incremented by one. If the random number is between $B_1$ and $B_2$, array element $A_{i2}$ is incremented by one, and so forth. Generally, if a random number r is between $B_{j-1}$ and $B_j$, array element $A_{ij}$ is incremented by one.

Thus, as a random number is generated, an element $A_{ij}$ of array $A_i$ is incremented. Because M may be large, storing M random numbers places a relatively heavy burden on the DBMS. By incrementing an array element $A_{ij}$ immediately upon generating a random number, the random number may be discarded so that permanent storage of the random number can be avoided. Instead of storing the M random numbers, a count of the random numbers occurring in each node is stored instead, which can greatly reduce the amount of fit data to store.

Figure 5:
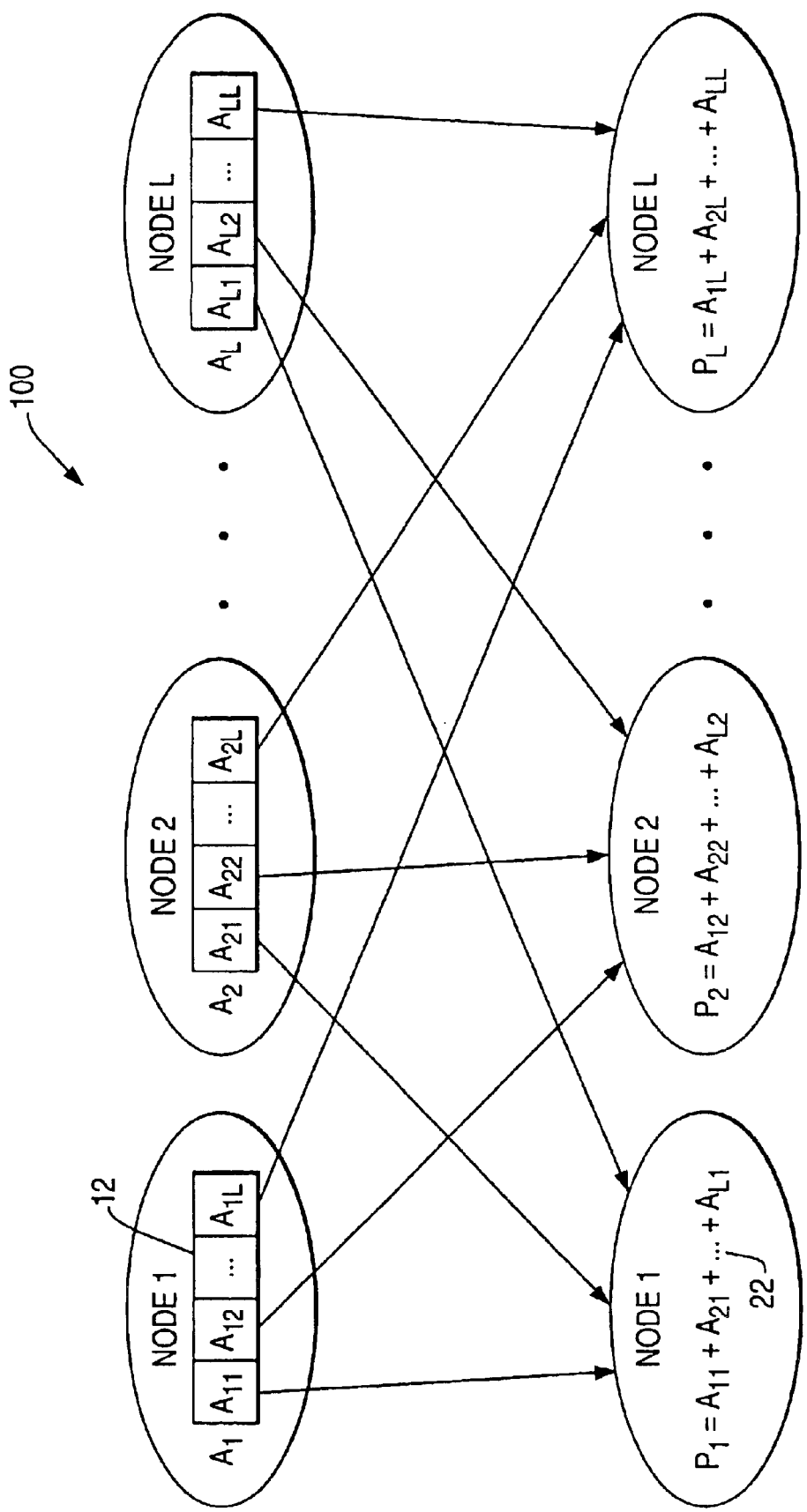
FIG. 5 illustrates how the system uses the array elements of FIG. 4 to determine the number of random sample tuples to obtain in each node.

Once the array elements $A_{ij}$ have been incremented in response to the generated random numbers R, the elements $A_{ij}$ are distributed among the nodes 10 of the parallel RDBMS 100, as depicted in FIG. 5. Array element $A_{ij}$ is sent from node i to node j. Thus, at node 1, array element $A_{11}$ stays in node 1, array element $A_{12}$ is sent to node 2 and array element $A_{1L}$ is sent to node L. At node 2, array element $A_{21}$ is sent to node 1, array element $A_{22}$ stays in node 2, and array element $A_{2L}$ is sent to L. This procedure is implemented independently at all L nodes.

Once all the array elements have been redistributed among the nodes, a sum $P_i$ is created to represent a sum of all the array elements received at node i. The sum $P_i$ is a sum of array elements $A_{1i} + A_{2i} + \ldots + A_{Li}$. Sums $P_1, P_2, \ldots$ and $P_L$ are shown in FIG. 5.

In one embodiment, the sum $P_j$ of the array elements $A_{ij}$ determines the number of random sample tuples to be obtained from the relation 20 at node i. Recall that node i includes $N_i$ tuples of the relation 20. In one embodiment, $P_i$ random sample tuples are obtained from the $N_i$ tuples. The sum of all the $P_i$s in the parallel RDBMS 100 equals M. This may be shown by the following equation:

$$P_j = \sum_{i=1}^{L} A_{ij}.$$

From there, the following is derived:

$$\sum_{j=1}^{L} P_j = \sum_{j=1}^{L} \sum_{i=1}^{L} A_{ij} = \sum_{i=1}^{L} \sum_{j=1}^{L} A_{ij} = \sum_{i=1}^{L} M_i = M.$$

Figure 6:
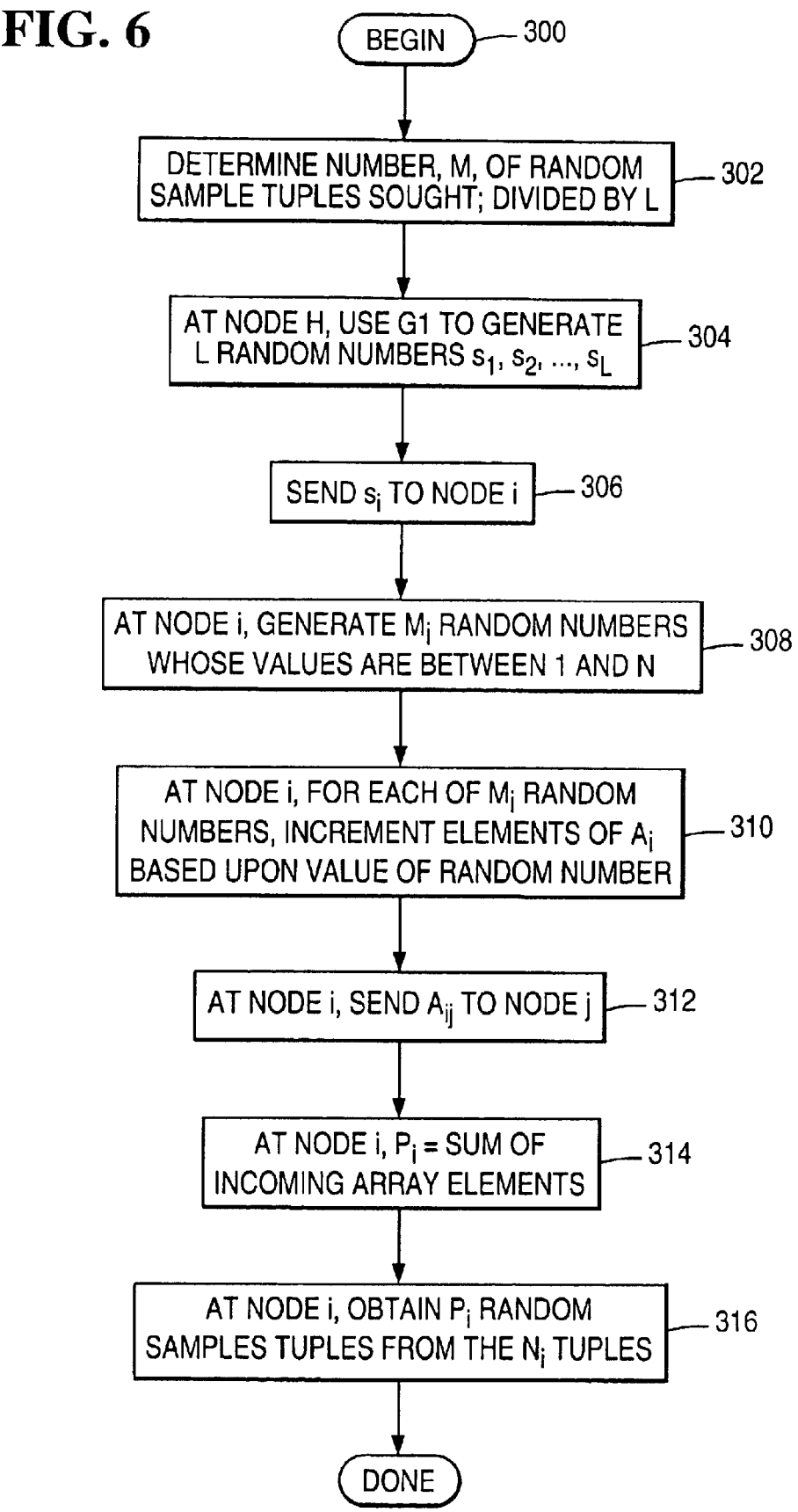
FIG. 6 is a flow diagram of a process of performing parallel simple random sampling according to one embodiment of the invention.

A process of generating random numbers according to an embodiment is shown in FIG. 6. From the N available tuples, a portion or percentage M of random sample tuples is sought. This number M is divided by the number of nodes (L) in the parallel RDBMS 100 (block 302). In one embodiment, a nearly equal number of random numbers is generated at each node of the parallel RDBMS 100. Where L does not divide evenly into M, some nodes may generate more random numbers than others.

At one of the nodes of the parallel RDBMS 100, the random number generator $G_1$ is used to generate L random numbers $s_1, s_2, \ldots,$ and $s_L$ (block 304). As noted above, the random number generator $G_1$ is actually a pseudo-random number generator, in which a predetermined sequence of random numbers is generated. This predetermined sequence may be modified by changing the seed of the random number generator $G_1$.

In one embodiment, each random number seed $s_i$ is sent to node i (block 306). Thus, each node of the parallel RDBMS 100 receives one of the random number seeds. Subsequent operations in FIG. 6 are performed at each node in parallel.

At each node i, using seed $s_i$, the second random number generator $G_2$ (which is also a pseudo-random number generator) is used to obtain more random numbers with values between 1 and N, where N equals the total number of tuples in the parallel a RDBMS 100. At node i, in one embodiment, $M_i$ random numbers are generated (block 308), where $$M = \sum_{i=1}^{L} M_i.$$

As described above and as shown in FIGS. 4 and 5, each of the random numbers is evaluated or classified according to where in the range of 1 to N the random number falls. Accordingly, elements of the array $A_i$ at each node are incremented based upon the value of each random number (block 310). Once all the random numbers have been evaluated, the array elements are distributed among the nodes of the parallel RDBMS, as in FIG. 5 (block 312). A sum, $P_j$, is generated at each node j, where $P_j$ equals the sum of the incoming array elements (block 314) at each node i.

In one embodiment, the sum $P_i$ is the number of random sample tuples to be obtained from the node i. Accordingly, $P_i$ random sample tuples are obtained from the $N_i$ tuples that are stored in the relation 20 at node i (block 316).

The following describes one example technique of obtaining $P_i$ random sample tuples in node i, which stores $N_i$ tuples. Assume the $N_i$ tuples are made up of tuples x to $x+(Ni-1)$. A random number generator (separate from $G_1$ or $G_2$) is used to generate $P_i$ random numbers in the range between x and $x+(N_i-1)$. The Pi random numbers are used as indices to select $P_i$ random samples from the $N_i$ tuples.

Generally, the parallel random sampling mechanism discussed herein includes using random number generators to generate, in parallel, random numbers in each of the plural nodes in a parallel database system, and using the random numbers to determine how many random samples from a table portion in each node to provide. In one arrangement, a plurality of ranges are defined, and the number of occurrences of random numbers in each of the ranges is counted. This is then used to determine the number of random samples to provide in each node. By distributing the work across plural nodes, a more efficient random sampling mechanism is provided.

The various devices and systems discussed each includes various software routines or modules, such as the random sampling routines 16. Such software routines or modules are executable on corresponding control units or processors. Each control unit or processor includes a microprocessor, a microcontroller, a processor module or subsystem (including one or more microprocessors or microcontrollers), or other control or computing devices. As used here, a "controller" refers to a hardware component, software component, or a combination of the two. Although used in the singular sense, a "controller" can also refer to plural hardware components, plural software components, or a combination thereof.

Instructions of the software routines or modules are stored in storage units, which include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). The instructions when executed by a respective control unit or processor cause a corresponding device or system to perform programmed acts.

The instructions of the software routines or modules are loaded or transported to each device or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such a carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a parallel database system having plural nodes, comprising:

providing random number generators in the plural nodes;

generating, in parallel random numbers using the random number generators in the plural nodes; and performing random sampling using the generated random numbers.

2. The method of claim 1, wherein providing the random number generators in the plural nodes comprises providing random number generators in at least some of the plural nodes.

3. The method of clam 1, wherein the random number generators in the plural nodes are part of a first set of random number generators, the method further comprising using at least one other random number generator to generate random numbers provided as seeds to the first set of random number generators.

4. The method of claim 1, further comprising determining a number of random samples to select in each node based on the generated random numbers in the node.

5. The method of claim 1, further comprising:
providing a plurality of parameters;
adjusting values of the parameters based on values of the random numbers; and
determining a number of random samples to select based on the parameters.

6. The method of claim 5, wherein providing the parameters, adjusting the values of the parameters, and determining the number of random samples are performed in each of the plural nodes.

7. The method of claim 5, further comprising:
associating the parameters with corresponding predefined ranges;
determining which range each random number falls within; and
adjusting the value of one of the parameters based on the determined range of each random number.

8. The method of claim 7, wherein adjusting the value of the one parameter comprises incrementing the value of the one parameter.

9. The method of claim 8, wherein incrementing the value of the one parameter occurs in response to each occurrence of a random number in the determined range.

10. The method of claim 7, further comprising communicating certain of the parameters between nodes, each node determining the number of random samples based on the communicated parameters.

11. The method of claim 1, further comprising:
defining plural ranges; and
counting a number of occurrences of random numbers in each of the plural ranges.

12. The method of claim 11, further comprising:
storing plural parameters having values set to represent the number of occurrences of random numbers in corresponding ranges.

13. The method of claim 1, further coring:
generating random number seeds at one node;
sending the random member seeds to plural nodes from the one node; and
the random number generators in the plural nodes using corresponding random number seeds.

14. A database system comprising:
a plurality of nodes, wherein each of at least two of the plurality of nodes comprises:
a storage for storing tuples of a relation; and
a controller adapted to generate random numbers;
the controller adapted to determine a number of random samples to generate in the node using the random numbers.

15. The database system of claim 14, wherein each node further comprises a processor, and wherein the controller is a software program executable by the processor.

16. The database system of claim 14, wherein one of the nodes comprises a first random number generator, and wherein each of the nodes comprises a second random number generator to generate the random numbers, the first random number generator to generate random number seeds for use by the second random number generators.

17. The database system of claim 16, wherein the one node communicates the random number seeds to corresponding nodes.

18. The database system of claim 16, wherein the plural nodes comprise nodes i, i=1–L, wherein the first random number generator is adapted to generate random number seeds $s_i$, i=1L, and wherein the one node is adapted to send each random number seed $s_i$ to node i.

19. The database system of claim 18, wherein the second random number generator in each node i is adapted to generate random numbers $r_1 \ldots r_{Mi}$, where $M_i$ represents a number of random numbers to be generated in node i.

20. The database system of claim 19, the storage in each node i to store array elements $A_{i1} \ldots A_{iL}$, the controller adapted to adjust the value of $A_{ij}$, j equal to a value between 1 and L, based on which of plural predefined ranges each random number r fills within.

21. The database system of claim 20, wherein each node is adapted to communicate certain of these array elements to other nodes.

22. The database system of claim 21, wherein the controller in each node is adapted to sum values of the array elements to derive the number of random samples to generate.

23. An article comprising at least one storage medium storing instructions that when executed cause a database system to:
generate random numbers in each of plural nodes of the database system; and
use the random numbers to determine a number of random samples to generate in each node.

24. The article of claim 23, wherein the instructions when executed cause the database system to provide a first random number generator in each node to generate the random numbers.

25. The article of claim 24, wherein the instructions when executed cause the database system to provide a second random number generator in one of the nodes to generate random number seeds for use by the first random number generators.

26. The article of claim 25, wherein the instructions when executed cause the database system to distribute the random number seeds to the plural nodes.

27. The article of claim 23, wherein the instructions when executed cause the database system to further:
define parameters in each node; and
adjust the parameters based on values of the random numbers in each node, wherein determining the number of random samples is based on the parameters.

28. The article of claim 27, wherein the instructions when executed cause the database system to distribute certain of the parameters from each of the nodes to other nodes.

29. The article of claim 28, wherein the instructions when executed cause the database system to sum the parameters at each of the nodes to derive the number of random samples.

30. An article comprising at least one storage medium storing instructions executable in a database system having plural nodes, the instructions when executed causing a system to:
generate random number seeds;
communicate the random number seeds to the plural nodes; and
generate random numbers in each node using at least one of the random number seeds.

31. The article of claim 30, wherein the instructions when executed cause the database system to determine a number of random samples to generate in each node based on the generated random number.

* * * * *

UNITED STATES PATENT AND TRADEMARK OFFICE
CERTIFICATE OF CORRECTION

PATENT NO.    : 6,889,221 B1
DATED         : May 3, 2005
INVENTOR(S)   : Luo, G. and Shatdal, A.

It is certified that error appears in the above-identified patent and that said Letters Patent is hereby corrected as shown below:

Column 7,
Line 45, after "further" delete "coring" and insert -- Compromising --.

Column 8,
Line 7, after "si," delete "i-1L" and insert -- i=1-L --.
Line 17, after "r" delete "fills" and insert -- falls --.
Line 68, after "random", delete "number" and insert -- numbers --.

Signed and Sealed this

Twentieth Day of December, 2005

JON W. DUDAS
*Director of the United States Patent and Trademark Office*